Patented Mar. 7, 1944

2,343,713

UNITED STATES PATENT OFFICE 2,343,713

SOFT-CURD MILK

Bernhard Spur, Copenhagen, Denmark, assignor to Chr. Hansen's Laboratory, Inc., Little Falls, N. Y.

No Drawing. Application December 14, 1939, Serial No. 309,291

9 Claims. (Cl. 99—54)

This invention relates to milk made more readily digestible in the human stomach by a partial or full performance of the first step in the digestion of milk, in the same manner as it occurs naturally in the stomach of the calf, by means of the action of the rennet enzyme. This action causes a lowering of the curd tension of the milk to a value well below the 33 grams, which is the New York City standard for soft curd milk.

A principal object of the present invention is to provide a method of producing a milk of easy and quick digestibility in which the casein has been changed either in part or wholly to paracasein by rennin so that, while the milk retains all of its valuable soluble calcium salts, it has already had the first step in digestion, and hence more nearly approaches human milk in the property of forming a smaller particle size of soft curds in the human stomach, hence affording quick and easy digestion by Nature's own method to make the food of the calf, its mother's milk, more readily digestible.

A further object of the invention is to provide a process of treating milk with a quantity of rennet enzyme great enough to lower the curd tension to a chosen figure which may be well below 33 grams, and yet is small enough not to curdle the milk in a subsequent heating step, which optional treatment destroys the enzyme.

An additional object of the invention is to provide a milk which will curdle rapidly and easily in the human stomach, thus reducing the high buffer action of the casein, which the latter would have if retained in solution or suspension, this reduction in buffer action of the casein causing a quicker reaching of required acidity for the action of the normal pepsin content in the human stomach.

For many years, it has been known that cow's milk is digestible with difficulty in the human stomach because of the formation of a coarse, tough coagulum which offers far greater resistance to the penetration of the digestive juices than do the fine soft flocks of human milk. It has also been appreciated that, while human milk is digested in the human stomach at a pH of from three to four; cow's milk, because of the buffer action of the casein when in solution, has to be digested at a pH somewhat above five, which is obviously an unfavorable hydrogen ion concentration for the pepsin digestion of milk, since the action of that enzyme is best when the pH is below three. (Doan: Jour. Daily Science, Nov. 1938.)

My invention, therefore, contemplates the use of the rennet enzyme to produce a milk which will curdle out easily and quickly in the human stomach and therefore reduces the buffer action of the casein by taking it from solution or suspension, thus permitting the gastric juices to reach quickly the pH favorable to digestion by secretion of fluids containing hydrochloric acid. The pre-treated milk will then curdle in fine, soft flocks, for the casein is present either in part or in whole as paracasein because of the action of the rennet enzyme, which has performed the first step in the digestion of the casein in about the same manner as it occurs in the stomach of the calf, which possesses the special enzyme, rennin, for digestion of its mother's milk.

It is not suggested that other methods of lowering the curd tension of milk are wholly unsatisfactory, such as by heating, beating, homogenizing, selection of raw milk, zeolite treatment, subjecting to the action of intense compressional wave energy by means of a sonic oscillator, and by the action of pancreatin, but it is urged that these older methods have some objection not found in the present process. For example, the use of pancreatic enzymes imports actions quite different from the first step in the digestion of the milk by the calf, and further from human digestion in the stomach than the normal action of rennet. Moreover, rennet has been approved for use by those of a faith that cannot accept milk treated by enzymes of swine origin. The objection to the zeolite treatment is that it removes about a fifth of the valuable calcium and phosphorous salts from the natural milk and this would be harmful as retarding the development of the bones, particularly the teeth of infants. The choice of natural soft curd milk from selected cows which produce milk of naturally low curd tension owing to an abnormally low concentration of casein is unwise for such milk lacks the normal high percentage of calcium salts and it has also been found that mastitis, a disease of the udder, tends to cause a production of soft curd milk. Such selection also favors the less rich milk for the average curd tension of milk from Holstein cows runs about sixteen grams lower than the average curd tension of 69 grams for milk from Jersey cows.

A modification of the process of this invention includes the discovery that a milk, particularly suitable for invalids, with a curd tension approaching zero can be prepared by a quick chilling of the milk at the moment of incipient curdling and maintaining the substantial dormancy of the enzyme by keeping the milk at refrigerator temperature. Especially when such milk is later to be homogenized it is advisable to lengthen the time of the treatment of the milk with the rennet enzyme as this extends materially the time between the first evidence of incipient curdling and the formation of an appreciable quantity of curds. This may be accomplished by holding the milk treated with the rennet enzyme at within the optimum limits of temperature (86–135° F.) for more than ten minutes, which may not be considered desirable, but preferably by treating the milk at or above the upper limit of the optimum temperatures so as to cause a slow action in the change from casein to paracasein and a subsequent increase in the length of time from the first sign of incipient curdling to the time of complete curdling. By thus extending the time the chilling can be accomplished before sufficient curds are formed to cause a possible choking of the homogenizer as would occur if appreciable curdling occurred before the chilling could be completed. In this process the rennet enzyme in any of its commercial forms, powder, tablets, liquid, etc. is added to milk in an amount sufficient to lower the curd tension to approximately the point of incipient curdling, which will give a curd tension between 5 grams and zero.

A further modification of the invention includes the addition of any of the well-known colloids, including sodium alginate, gelatin, etc., which I have found can be used, when desired, to give additional stabilization to the product. This may be especially advisable when a milk is required, having a curd tension below 25 grams, which will not curdle in hot beverages or on boiling, or to prevent a milk, which has been reduced to a low curd tension from 5 grams to zero, from settling out on standing.

In practicing my invention the rennet enzyme in any of its commercial forms, powder, tablets, liquid, etc., is added to the milk in an amount sufficiently great to lower the curd tension to a chosen figure between 33 grams and zero, and an amount sufficiently small so that the time between the first sign of incipient curdling and appreciable curdling is sufficiently long to quickly cool the milk before appreciable curdling takes place, or if the product is to be subsequently pasteurized or heated, the amount of rennet enzyme must be small enough to insure against curdling during such later treatment.

The amount of rennet enzyme to be added varies within wide limits, as it depends upon:

(1) The strength of the chosen rennet preparation employed, varying in strength from that of the ordinary liquid cheese rennet to the strong cheese preparation in powder or tablet form, which is usually thirteen times as strong as the ordinary liquid rennet, but preparations have also been marketed which are at least fifty times as strong as the ordinary liquid rennet, and these can also be used.

(2) The character and the chemical and physical properties of the milk, all of which depend upon the breed of cows, the season of the year, the period of lactation from the time of freshening, and the ripeness of the milk when it reaches the milk plant. Milk from cows which have just freshened will require a larger amount of rennet to produce a given result, and this required amount gradually decreases until the end of the period of lactation. Milk having a low pH will require less rennet enzyme than milk with a high pH to accomplish the desired results.

My research has, however, definitely shown that, regardless of these variations, and even when the pH of normal milk has been artificially increased in the laboratory to 7, which is well above the usual limits for mixed market milk (which according to authorities has a pH of from 6.4 to 6.8), the desired change of the casein to paracasein, and the desired lowering of the curd tension can be obtained by use of larger amounts of the rennet enzyme.

(3) The time and the temperature of exposure of the rennet enzyme.

(4) The method of pasteurization, of subsequent heating, sterilization, or drying: flash pasteurization requiring more, while slow pasteurization requiring less rennet enzime.

On account of all these varying factors, naturally definite limits cannot be established for universal use; but knowing these factors anyone familiar with the well-known methods of laboratory control, among which are included the lactometer, the commercial rennet test used in cheese-making, the Mann's test for acidity, and an accepted curd tension apparatus can readily establish the amount of rennet enzyme of a given standard strength necessary under the wide range of conditions described above. There are several methods of measuring the curd tension but for the purpose of this patent I have used the accepted Submarine Signal Company Curdometer, which instrument and the Hill curdometer give closely agreeing results.

As a specific example, one part by weight of rennet powder, National Formulary test, to 80,000 parts of mixed Holstein milk for the Mohawk Valley trade from cows of various stages in the period of lactation, from the time of freshening to the end of the period of lactation, added at approximately 45° F., heated gradually to a pasteurization temperature of 145° F. in 25 minutes, then held at this temperature for 30 minutes, and cooled down to the usual bottling temperature, resulted in a reduction of curd tension of the milk, in this instance, to 25 grams, from an original curd tension of 46 grams.

Under the same conditions the ratios of rennet enzyme to milk for other curd tensions were:

For 30 grams_____ 1 to 90,000
For 5 grams_____ 1 to 50,000
For 0 gram_____ 1 to 45,000

As a second example, to mixed market milk with a curd tension of 42 grams which had been allowed to ripen to a Mann's test of 11, rennet powder was added at approximately 45° F., heated gradually in 19 minutes to the optimum temperature of 125° F., and held at this optimum temperature for 10 minutes, then gradually heated up in 7 minutes to 145° F., then held at this pasteurization temperature for 30 minutes and cooled down to the usual bottling temperature. The ratios in this case were:

For 30 grams_____ 1 to 600,000
For 25 grams_____ 1 to 550,000
For 5 grams_____ 1 to 450,000
For 0 gram_____ 1 to 375,000

As a third example, mixed market milk with a Mann's test of 8 and an original curd tension of 35 grams, treated as just above, required:

For 30 grams_____ 1 to 80,000
For 25 grams_____ 1 to 53,000
For 5 grams_____ 1 to 20,000
For 0 gram_____ 1 to 15,500

For a mixed market milk, from cow's recently freshened, specific gravity 1.0285, curd tension 46 grams, in which the rennet powder was added at 45° F., heated gradually to a pasteurizing temperature of 145° F., in 25 minutes, held at this temperature for 30 minutes and cooled to bottling temperature, the following ratios of rennet powder of National Formulary test to milk were required for the stated curd tensions:

For 30 grams_____ 1 to 95,000
For 25 grams_____ 1 to 77,000
For 5 grams_____ 1 to 52,000
For 0 gram_____ 1 to 49,000

As a fifth example, to mixed market milk with a curd tension of 46 grams from cows which were near the end of the period of lactation, with a specific gravity of 1.035, rennet was added at approximately 45° F., heated gradually to a pasteurization temperature of 145° F. in 25 minutes, then held at this temperature for 30 minutes and cooled down to the usual bottling temperature. This milk required the following ratios of rennet to milk:

For 30 grams_____ 1 to 110,000
For 25 grams_____ 1 to 100,000
For 5 grams_____ 1 to 66,000
For 0 grams_____ 1 to 65,000

As a sixth example, where the milk of curd tension of 53 grams was from cows recently freshened and the rennet was added at 45° F., heated in 35 seconds to a temperature of 160° F., and held at this flash pasteurization temperature for 15 seconds, followed by immediate cooling down to bottling temperature, the ratios of rennet to milk were:

For 30 grams_____ 1 to 4,800
For 25 grams_____ 1 to 4,600
For 5 grams_____ 1 to 3,200
For 0 gram_____ 1 to 3,000

As a final example, to mixed market milk of curd tension of 45 grams from cows of various stages in the period of lactation from the time of freshening to the end of the period of lactation, the rennet powder was added at a temperature of 130° F., heated gradually to a pasteurization temperature of 145° F., in 7 minutes, then held at this temperature for 30 minutes, and cooled down to the usual bottling temperature. The ratios of powder to milk were:

For 30 grams_____ 1 to 20,000
For 25 grams_____ 1 to 13,900
For 5 grams_____ 1 to 9,000
For 0 gram_____ 1 to 8,000

From these examples it will be seen that, depending upon the character of the milk and the mode of treatment, we must include a very wide range in the amounts of rennet enzyme to be used and the largest amount of rennet enzyme which probably would be used in practice would be one part of rennet power, National Formulary test (or its equivalent in any other rennet preparation to give the same curdling power in the milk) to 3,000 parts of mixed market milk, whereas the smallest amount of rennet enzyme which would be used would probably be one part of rennet powder, National Formulary test (or its equivalent in any other rennet preparation to give the same curdling power in the milk), to 600,000 parts of mixed market milk.

However, if the operator should, for some reason, hold the milk at the optimum temperature for the rennet enzyme for a longer period than the ten minutes, which we have chosen as the maximum desirable time to hold the milk at a lukewarm temperature, a much smaller amount of rennet enzyme would be needed than the minimum stated in the above limits, and if, on the other hand, the operator should for some reason add the rennet enzyme at a temperature above 130° F. and immediately thereafter, heat to the pasteurization temperature of 145° F., thus allowing an unreasonably short time for its action and tending to destroy the enzyme, a much larger amount of rennet enzyme would be needed than the maximum stated in the above limits.

In practice, just as the cheesemaker judges the amount of rennet enzyme necessary from day to day, using his knowledge of the character of the milk and simple factory tests, as well as the amount of rennet enzyme required on the previous day, the operator can readily determine the correct amount of rennet enzyme to produce the necessary change in casein to paracasein as indicated by the curd tension required under his own conditions of operation.

What I claim is:

1. The process of producing a milk of quick and easy digestibility which consists in adding to the milk a quantity of rennet enzyme within the temperature limits of its activity to change at least part of the casein of the milk to paracasein with a consequent lowering of the curd tension below 33 grams, and lowering the temperature of the milk prior to curdling to render the rennet enzyme dormant.

2. The process of producing a fine flocculently curdled milk of quick and easy digestibility by change of substantially all of the casein of the milk to paracasein, which consists in adding to a milk having the pH of natural mixed market milk, a quantity of rennet enzyme sufficiently large to lower the curd tension below five grams and rapidly chilling the milk when curdling is incipient to render dormant the rennet enzyme.

3. The process of treating skim milk which consists in adding rennet enzyme to the skimmilk to change substantially all the casein to paracasein, thus lowering the curd tension below five grams, rapidly chilling the skim milk at the point of incipient curdling to render dormant the rennet enzyme, and homogenizing the chilled skimmilk, whereby fine flocculent curds will be produced which will not readily separate out on standing.

4. The process of claim 1 in which the milk is held at a temperature above 130° F., while the rennet enzyme is acting, whereby to lengthen the time between incipient and substantial curdling to give greater opportunity for a convenient method of chilling without too great an amount of curdling.

5. The process of claim 1 in which the time of treatment with the rennet enzyme within the range 86° F. to 135° F. exceeds ten minutes whereby to lengthen the time between incipient and substantial curdling to give greater opportunity for a convenient method of chilling without too great an amount of curdling.

6. The process of producing a milk of easy and quick digestibility without loss of its calcium value which consists in adding to a milk having a normal hydrogen ion concentration of from 6.4 to 6.8 pH, a quantity of rennet enzyme sufficient to lower the curd tension well below 33 grams on a Submarine Signal or a Hill curdometer, at such temperature and for such time as to change a material portion of the casein to paracasein, and then altering the temperature of the treated milk prior to curdling in order to render the rennet enzyme inactive, said treated milk curdling rapidly in the human stomach in fine soft curds or flocks, thus permitting the gastric juices to reach quickly the pH favorable to digestion by action of the normal pepsin content in the human stomach.

7. The process of producing a milk of easy and quickly digestibility without loss of its calcium value which consists in adding to a milk having a normal hydrogen ion concentration of from 6.4 to 6.8 pH a quantity of rennet enzyme sufficient to lower the curd tension well below 33 grams on a Submarine Signal or a Hill curdometer, at such temperature and for such time as to change a material portion of the casein to paracasein, and then raising the temperature of the milk prior to curdling to destroy the rennet enzyme, said treated milk curdling rapidly in the human stomach in fine soft curds or flocks, thus permitting the gastric juices to reach quickly the pH favorable to digestion by action of the normal pepsin content in the human stomach.

8. The process of claim 7 in which the major portion of the casein is changed to paracasein.

9. The process of claim 6 in which the major portion of the casein is changed to paracasein.

BERNHARD SPUR.